United States Patent
Shimizu et al.

(10) Patent No.: US 10,732,616 B2
(45) Date of Patent: Aug. 4, 2020

(54) NUMERICAL CONTROLLER INCLUDING MEANS FOR CHECKING EXECUTION STATUS OF PROGRAM

(71) Applicant: FANUC CORPORATION, Minamitsuru-gun, Yamanashi (JP)

(72) Inventors: Kenji Shimizu, Yamanashi (JP); Kazuo Sato, Yamanashi (JP); Hideaki Maeda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 248 days.

(21) Appl. No.: 15/386,122

(22) Filed: Dec. 21, 2016

(65) Prior Publication Data

US 2017/0185079 A1    Jun. 29, 2017

(30) Foreign Application Priority Data

Dec. 25, 2015  (JP) ................. 2015-253309

(51) Int. Cl.
G05B 9/02       (2006.01)
G05B 23/02      (2006.01)
G05B 19/406     (2006.01)
G05B 19/4068    (2006.01)

(52) U.S. Cl.
CPC ....... G05B 23/0221 (2013.01); G05B 19/406 (2013.01); G05B 19/4068 (2013.01); G05B 2219/34195 (2013.01); G05B 2219/36047 (2013.01)

(58) Field of Classification Search
CPC .............. G05B 23/0221; G05B 19/406; G05B 19/4068; G05B 2219/34195; G05B 2219/36047
See application file for complete search history.

(56) References Cited

U.S. PATENT DOCUMENTS

| 5,043,644 A * | 8/1991 | Sasaki ................ G05B 19/4068 318/568.1 |
| 5,144,550 A | 9/1992 | Sasaki et al. |
| 5,758,061 A * | 5/1998 | Plum .................. G06F 11/3676 714/35 |
| 2006/0009878 A1* | 1/2006 | Kobayashi ............. B25J 9/1671 700/245 |
| 2008/0249653 A1 | 10/2008 | Ichikawa |

(Continued)

FOREIGN PATENT DOCUMENTS

CN    101281401 A    10/2008
CN    104570959 A    4/2015

(Continued)

OTHER PUBLICATIONS

Notification of Reasons for Refusal for Japanese Application No. 2015-253309, dated Dec. 5, 2017 with translation, 5 pages.

(Continued)

*Primary Examiner* — Zhipeng Wang
(74) *Attorney, Agent, or Firm* — RatnerPrestia

(57) ABSTRACT

A numerical controller that controls a machine based on a program includes a manual program execution instruction unit that gives instructions for advancing and reversing execution of the program in a manual manner, a program manual execution unit that sequentially executes the program, and a block information notification unit that identifies a block in the program the execution of which is about to be started, based on execution status of the program reported from the program manual execution unit, and that makes notification in accordance with an attribute of the identified block.

9 Claims, 13 Drawing Sheets

(56) References Cited

U.S. PATENT DOCUMENTS

| | | | | |
|---|---|---|---|---|
| 2009/0007000 | A1* | 1/2009 | Hasegawa | G05B 19/056 715/772 |
| 2010/0023156 | A1* | 1/2010 | Trepina | G05B 19/406 700/175 |
| 2011/0208346 | A1* | 8/2011 | Nagano | G05B 19/409 700/159 |
| 2012/0265949 | A1* | 10/2012 | Shimizu | G06F 13/1689 711/154 |
| 2015/0019002 | A1* | 1/2015 | Asahara | B23Q 11/0089 700/185 |
| 2015/0112459 | A1 | 4/2015 | Haraguchi | |

FOREIGN PATENT DOCUMENTS

| | | | |
|---|---|---|---|
| JP | 2-155004 | | 6/1990 |
| JP | 02220107 | A | 9/1990 |
| JP | 05143136 | A | 6/1993 |
| JP | 06138933 | A | 5/1994 |
| JP | H 08-1482 | A | 1/1996 |
| JP | 1049210 | | 2/1998 |
| JP | H 10-76445 | A | 3/1998 |
| JP | 2003271215 | A * | 9/2003 |
| JP | 2003271215 | A | 9/2003 |
| JP | 2013-168008 | | 8/2013 |

OTHER PUBLICATIONS

Notification of Reasons for Refusal for Japanese Application No. 2015-253309, dated Apr. 3, 2018, including English translation, 5 pages.

Chinese Office Action for Chinese Application No. 201611208491. 4, dated Apr. 16, 2019 with translation, 12 pages.

* cited by examiner

FIG. 4
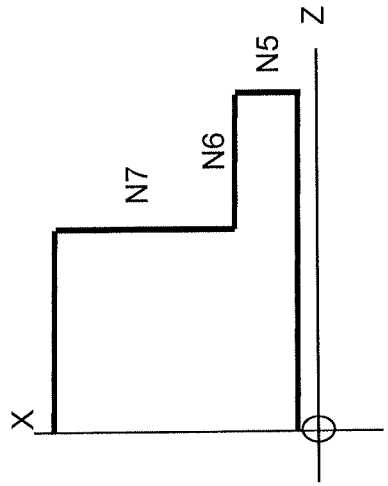
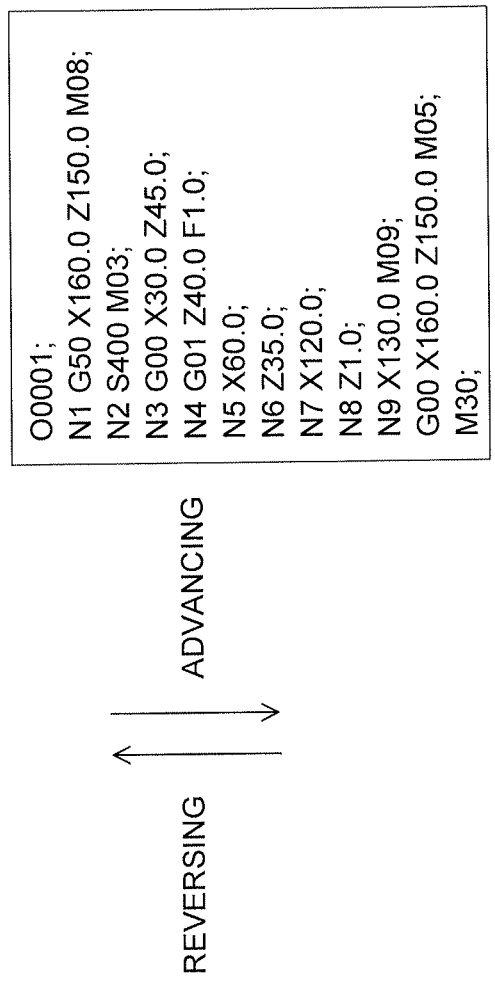
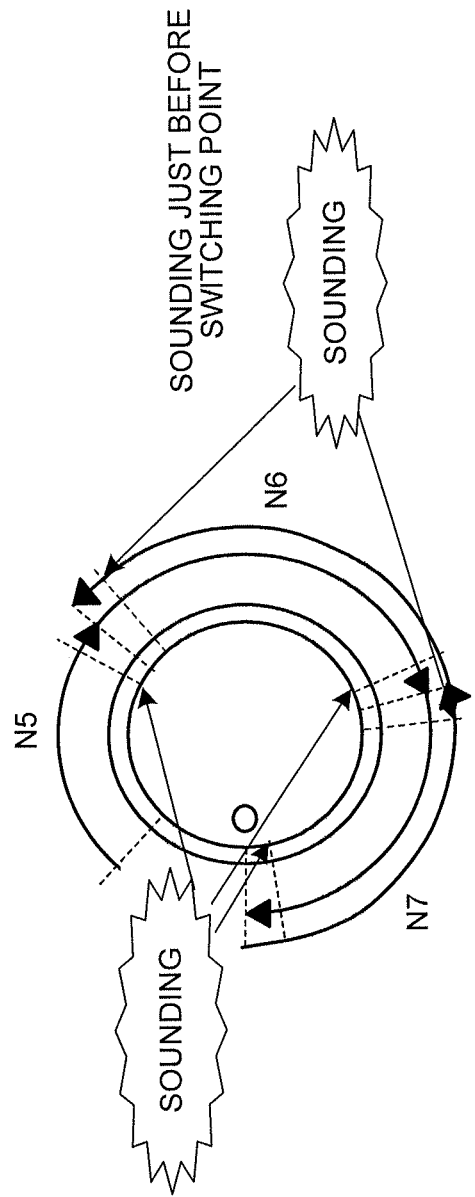

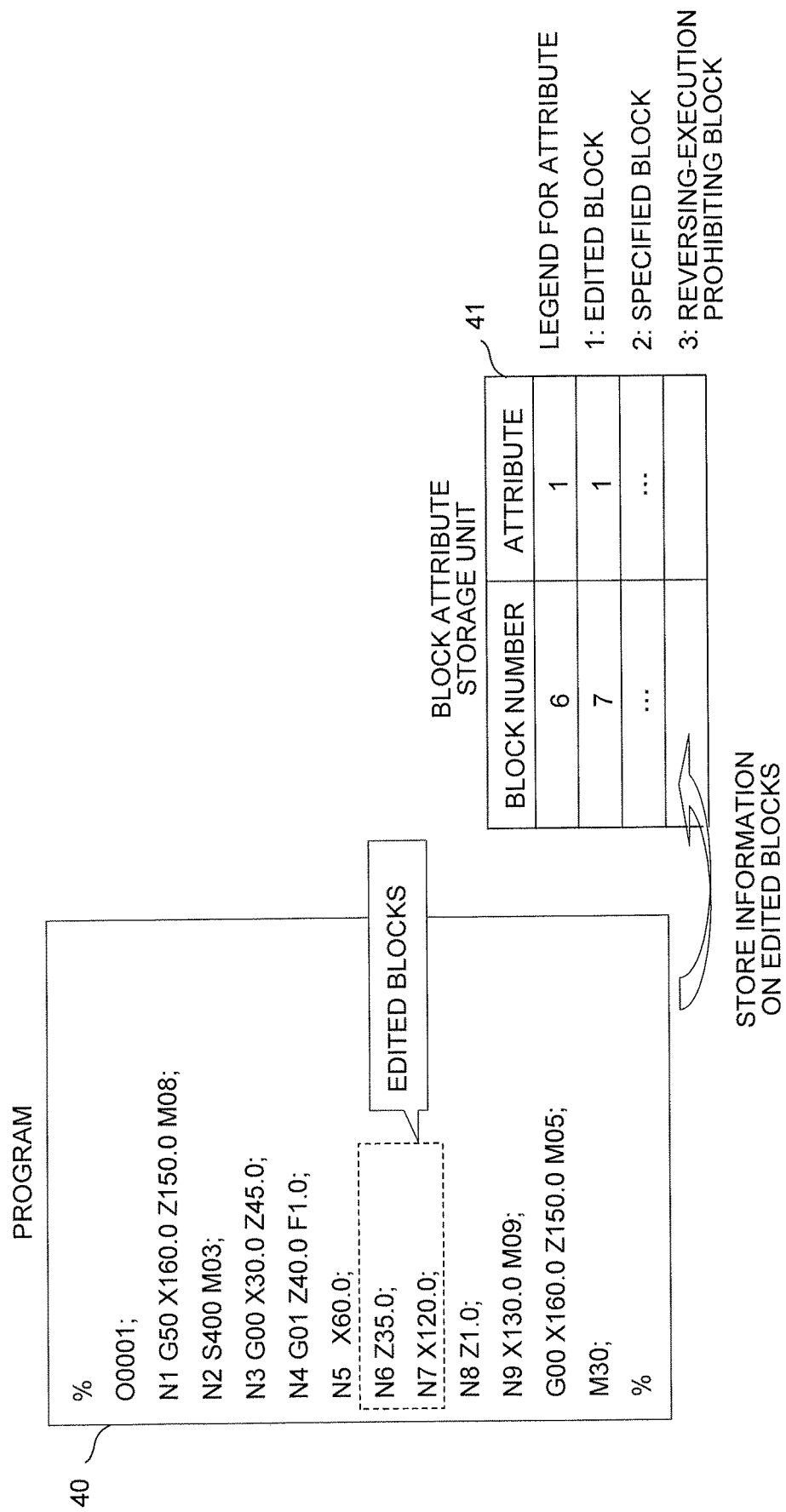

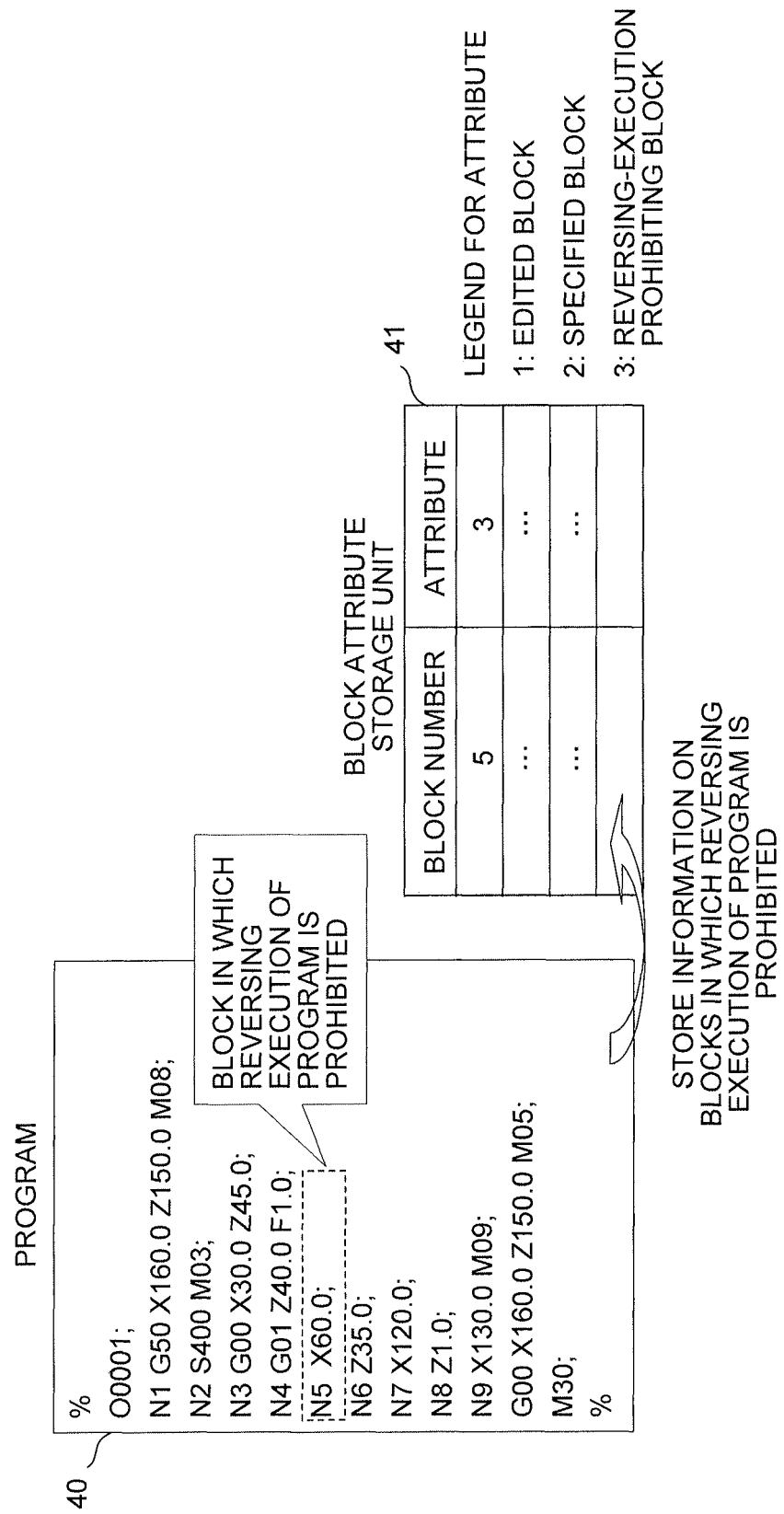

NUMERICAL CONTROLLER INCLUDING MEANS FOR CHECKING EXECUTION STATUS OF PROGRAM

BACKGROUND OF THE INVENTION

1. Field of the Invention

The present invention relates to a numerical controller and particularly relates to a numerical controller that enables efficient operation check on programs with use of a manual handle retrace function.

2. Description of the Related Art

In a machine tool having a plurality of control paths such as automatic lathe and multi-path lathe, conventionally, the manual handle retrace function is provided in which an operator controls operation of programs with use of a manual handle (see Japanese Patent Application Laid-Open No. 2-155004, for instance).

FIG. 14 is a diagram illustrating control over a machine tool through the manual handle retrace function.

When the manual handle retrace function is used, an operator is capable of advancing execution of program instructions by normal rotation of a manual handle 50, so that axis movement in the machine tool 51 is accordingly advanced. By reverse rotation of the manual handle 50, on the other hand, the operator is capable of reversing the execution of the program instructions, so that the axis movement in the machine tool 51 is accordingly reversed.

FIG. 15 is a diagram illustrating flow of operation check on a program with use of the manual handle retrace function. In the operation check on the program, as illustrated in FIG. 15, the operator visually checks motions of axes of the machine tool while advancing the program by normally rotating the manual handle 50. When finding out any problem in the motions of the axes of the machine tool in the check, the operator reversely rotates the manual handle 50 to reverse the motions of the machine tool to a position just before a problematic operation and operates a numerical controller to bring about an editing mode of the program. Then the operator corrects a program instruction that caused the problematic operation, on a manual handle retrace editing screen 52 and finishes editing. After that, the numerical controller is switched again to an operation mode and operation of the machine tool based on the corrected program is checked through operation of the manual handle 50. Thus use of the manual handle retrace function makes it possible for the operator to quickly and easily carry out correction and recheck of the program.

As a prior art technique for informing an operator of operating status of a program, Japanese Patent Application Laid-Open No. 2013-168008 discloses a technique of giving notification of arrival at an end point of a block by light from an illuminator in a machine. Japanese Patent Application Laid-Open No. 10-076445 discloses a technique of reporting operating status of a machine tool by a piece of music or the like.

In the operation check on a program with use of the manual handle retrace function, the operator needs to shift his/her gaze between inside of the machine tool and a program screen displayed on a display of the numerical controller in order to confirm whether arrival at a block to be checked has been attained or not.

Though it can be thought that the technique disclosed in Japanese Patent Application Laid-Open No. 2013-168008 or No. 10-076445 described above or the like is used in order to cope with such a situation, it is impossible to comprehend whether arrival at a block edited by the operator has been attained or not, based on only the light from the illuminator or only a piece of music.

SUMMARY OF THE INVENTION

An object of the invention is to provide a numerical controller that enables efficient operation check on a program with use of the manual handle retrace function.

The numerical controller according to the invention is configured so as to control a machine based on a program and includes a manual program execution instruction unit that gives instructions for advancing and reversing execution of the program in a manual manner, a program manual execution unit that sequentially executes the program based on the instructions from the manual program execution instruction unit, and a block information notification unit that identifies a block in the program execution of which is about to be started, based on execution status of the program reported from the program manual execution unit, and that makes notification in accordance with an attribute of the identified block.

The numerical controller may further include a block attribute storage unit that stores block attribute data in which block numbers of blocks included in the program and information indicating attributes of the blocks are associated and the block information notification unit may be configured so as to determine the attribute of the block in the program the execution of which is about to be started, based on the block attribute data stored in the block attribute storage unit.

The information indicating the attributes of the blocks may be information indicating that the blocks are edited block, information indicating that the blocks are blocks which are to be objects to be notified to an operator, or information indicating that the blocks are blocks in which the reversing execution of the program is prohibited.

The numerical controller may further include an instruction attribute storage unit that stores instruction attribute data in which instruction codes used in the program and information indicating attributes of the instruction codes are associated and the block information notification unit may be configured so as to determine the attribute of the block in the program the execution of which is about to be started, based on the instruction attribute data stored in the instruction attribute storage unit.

The information indicating the attributes of the instruction codes may be information indicating that the instruction codes are instruction codes in which the reversing execution of the program is prohibited.

The block information notification unit may output an instruction that prohibits the reversing execution of the program to the program manual execution unit when the attribute of the block the execution of which is about to be started is an attribute indicating that the reversing execution of the program is prohibited and the program manual execution unit may be configured so as to prohibit the reversing execution of the program upon receiving the instruction that prohibits the reversing execution of the program.

The block information notification unit may further be configured so as to make notification when remaining travels for axes given by a block being currently executed in the program are equal to or smaller than specified margins preset in advance, based on the execution status of the program reported from the program manual execution unit.

The invention eliminates necessity to shuttle a gaze between inside of the machine and a program screen and thus enables the operator to efficiently carry out operation check on the program with use of the manual handle retrace function.

BRIEF DESCRIPTION OF THE DRAWINGS

The above-mentioned and other objects and features of the invention will become apparent from the following description of embodiments with reference to the accompanying drawings, in which:

FIG. 4 is a diagram illustrating a block switching notification function in the use of the manual handle retrace function provided in the numerical controllers according to the invention;

FIG. 7 is a diagram illustrating an example of block attribute data stored in a block attribute storage unit in the numerical controller of FIG. 6;

FIG. 11 is a diagram illustrating an example of block attribute data stored in the block attribute storage unit in the numerical controller of FIG. 10;

DETAILED DESCRIPTION OF THE PREFERRED EMBODIMENTS

Initially, operations in functions introduced into numerical controllers according to the invention will be described with reference to FIGS. 1 to 4.

Figure 1:
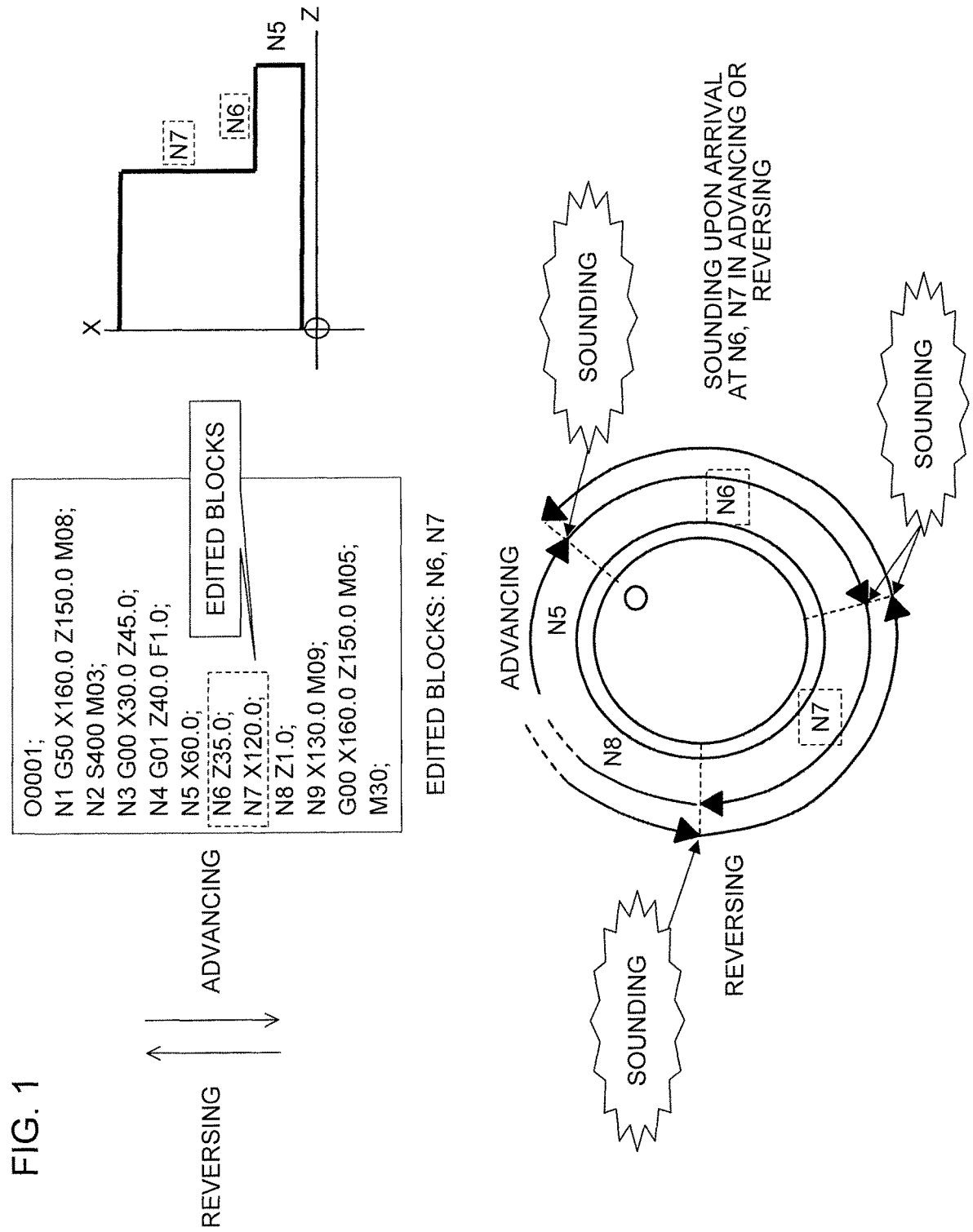
FIG. 1 is a diagram illustrating an edited block notification function in use of a manual handle retrace function provided in numerical controllers according to the invention.

FIG. 1 is a diagram illustrating an edited block notification function in use of the manual handle retrace function provided in the numerical controllers according to the invention.

When an operator edits a program in the use of the manual handle retrace function in the numerical controllers according to the invention, edited blocks in the edited program are temporarily stored in a memory. If a block the execution of which is about to be started is the block edited by the operator and stored in the memory when program instructions are advanced or reversed for recheck of operation of a machine tool based on edited program instructions, such purport is reported to the operator by sounding or the like.

Figure 2:
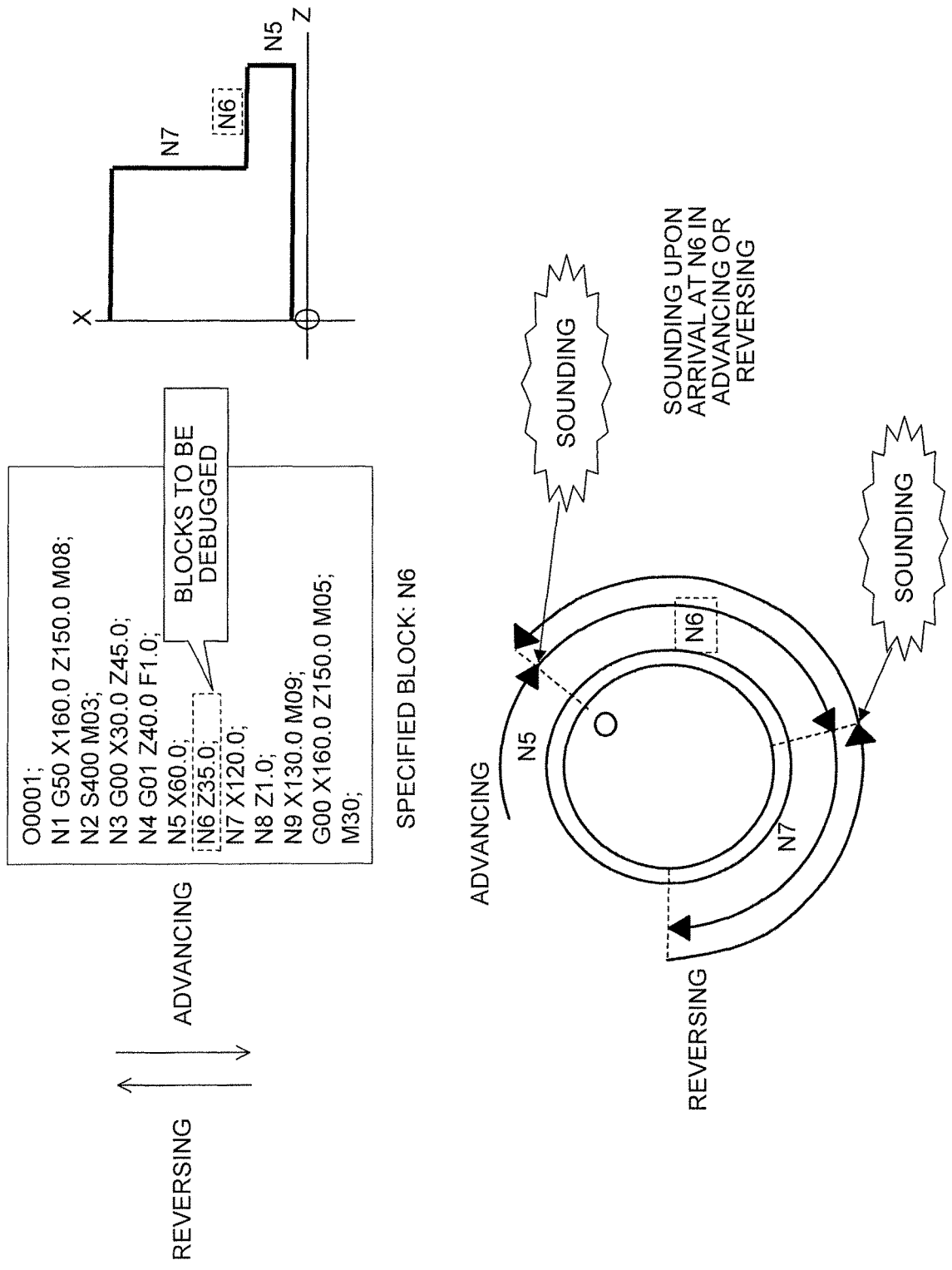
FIG. 2 is a diagram illustrating a specified block notification function in the use of the manual handle retrace function provided in the numerical controllers according to the invention.

FIG. 2 is a diagram illustrating a specified block notification function in the use of the manual handle retrace function provided in the numerical controllers according to the invention.

If the block the execution of which is about to be started in the use of the manual handle retrace function is a block specified by the operator, in the numerical controllers according to the invention, such purport is reported to the operator by sounding or the like based on the specified block notification function. In the specified block notification function, the sounding may be carried out in the event the block the execution of which is about to be started in advancing operation is the specified block and in the event the block the execution of which is about to be started in reversing operation returns to the specified block.

Figure 3:
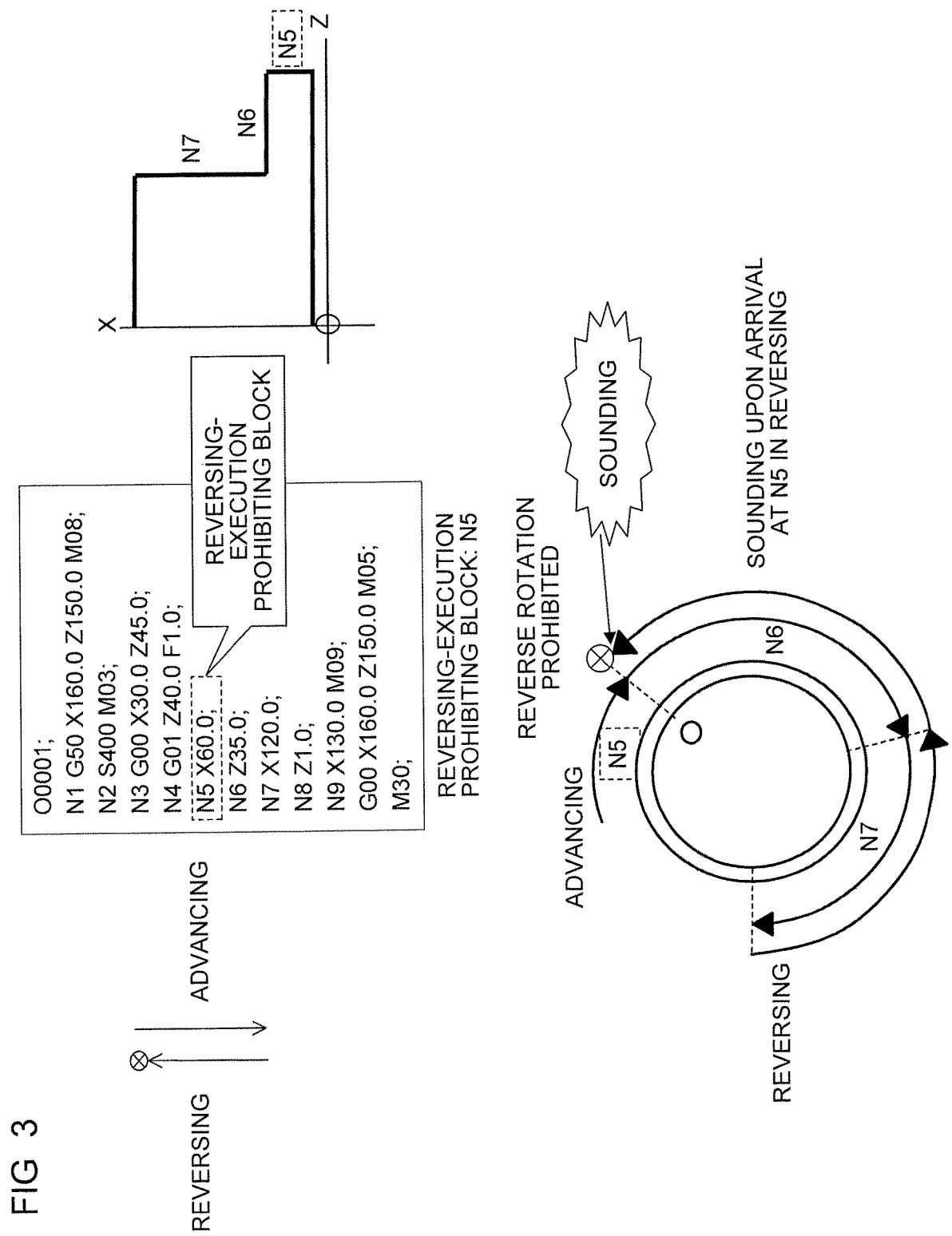
FIG. 3 is a diagram illustrating a reversing-execution prohibiting block notification function in the use of the manual handle retrace function provided in the numerical controllers according to the invention.

FIG. 3 is a diagram illustrating a reversing-execution prohibiting block notification function in the use of the manual handle retrace function provided in the numerical controllers according to the invention.

If the operator attempts to reverse execution of a program to a block including an instruction code in which the reversing is prohibited in conformity with specifications of the numerical controllers according to the invention or to a reversing-execution prohibiting block specified by the operator, in the numerical controllers, the reversing operation by the operator is prohibited and such purport is reported to the operator by sounding or the like based on the reversing-execution prohibiting block notification function. As a method of prohibiting the operator from the reversing operation, operation of a manual handle may be locked or control may be exercised so that the execution of the program may not be reversed even if the operator reversely rotates the manual handle.

FIG. 4 is a diagram illustrating a block switching notification function in the use of the manual handle retrace function provided in the numerical controllers according to the invention.

In the numerical controllers according to the invention, while program instructions are advanced or reversed with use of the manual handle retrace function, and when the execution of a block approaches a switching point to a subsequent block, such purport is reported to the operator by sounding or the like based on the block switching notification function.

Figure 5:
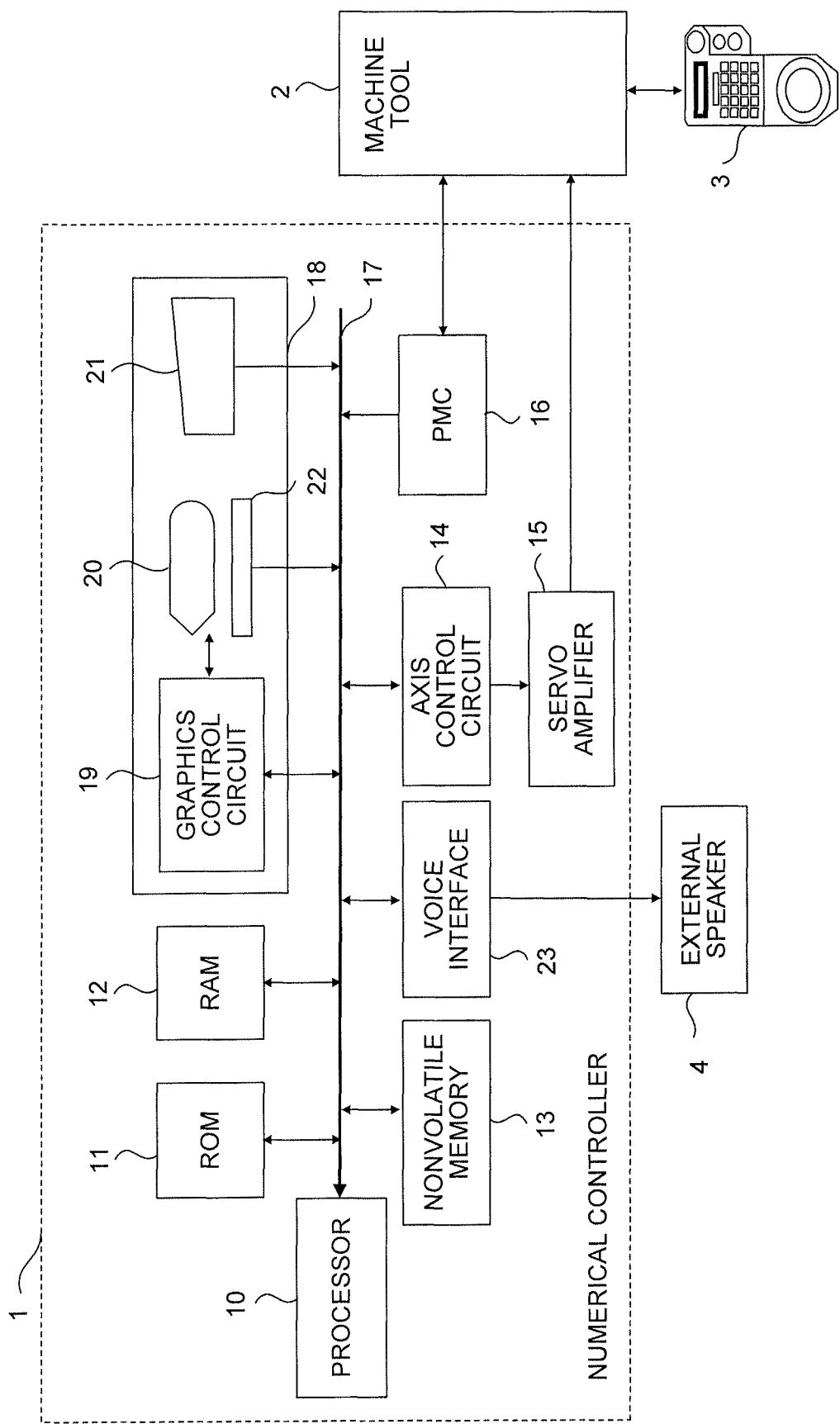
FIG. 5 is a schematic configuration diagram of a numerical controller according to an embodiment of the invention.

FIG. 5 is a schematic configuration diagram of a numerical controller according to an embodiment of the invention that attains the above four notification functions (edited block notification function, specified block notification function, reversing-execution prohibiting block notification function, and block switching notification function).

The numerical controller 1 is configured with a processor 10 being a principal element. The processor 10 controls the whole numerical controller 1 pursuant to system programs stored in a ROM 11. An EPROM or an EEPROM is used as the ROM 11.

A DRAM or the like is used as a RAM 12, in which temporary calculation data, display data, input/output signals, and the like are stored. A CMOS, an SRAM, or the like that is backed up by a battery (not illustrated) is used as a nonvolatile memory 13, in which parameters, machining programs, tool correction data, and the like that are to be retained even after power-off are stored.

A manual input device with display screen (LCD/MDI unit) 18 is placed at the same position as a front face or a machine control panel of the numerical controller 1 and is used for display of data and graphics, data input, and operation of the numerical controller 1. A graphics control circuit 19 converts digital signals such as numerical data and graphic data into raster signals for display and transmits the raster signals to a display device 20. The display device 20 displays such numerical values and graphics. A liquid crystal display device is chiefly used as the display device 20.

A keyboard 21 is composed of numeric keys, symbolic keys, character keys, and function keys and is used for preparation and editing of the machining programs and operation of the numerical controller 1. Software keys 22 are provided under the display device 20 and functions thereof are displayed on the display device 20. A change on a screen of the display device 20 causes changes in the functions of the software keys 22 in accordance with the functions displayed thereon.

Axis control circuits 14 receive moving instructions for axes from the processor 10 and output the moving instructions for the axes to servo amplifiers 15. The servo amplifiers 15 amplify the moving instructions, drive servo motors connected to a machine tool 2, and control relative motions between tools in the machine tool 2 and workpieces. The axis control circuits 14 and the servo amplifiers 15 numbers of which correspond to a number of the axes of the servo motors are provided, though the axis control circuit 14 and the servo amplifier 15 only for one axis are illustrated in FIG. 5.

A programmable machine controller (PMC) 16 receives M (miscellaneous) function signals, S (spindle speed control) function signals, T (tool selection) function signals, and the like from the processor 10 via a bus 17. The PMC 16 processes the signals by sequence programs so as to output output signals and thereby controls a pneumatic equipment, a hydraulic equipment, an electromagnetic actuator, and the like in the machine tool 2. Besides, the PMC 16 receives various signals such as button signals and switch signals from a machine control panel in the machine tool 2, and signals relating to handle operation from a manual handle 3 to be used as the manual program execution instruction unit, performs sequence processes on the received signals, and transfers, via the bus 17, input signals required for the processor 10.

In FIG. 5, illustration of a spindle motor control circuit, an amplifier for spindle motor, and the like is omitted.

A voice interface 23 receives a sounding instruction from the processor 10 and makes an external speaker 4 emit a sound designated by the sounding instruction.

Figure 6:
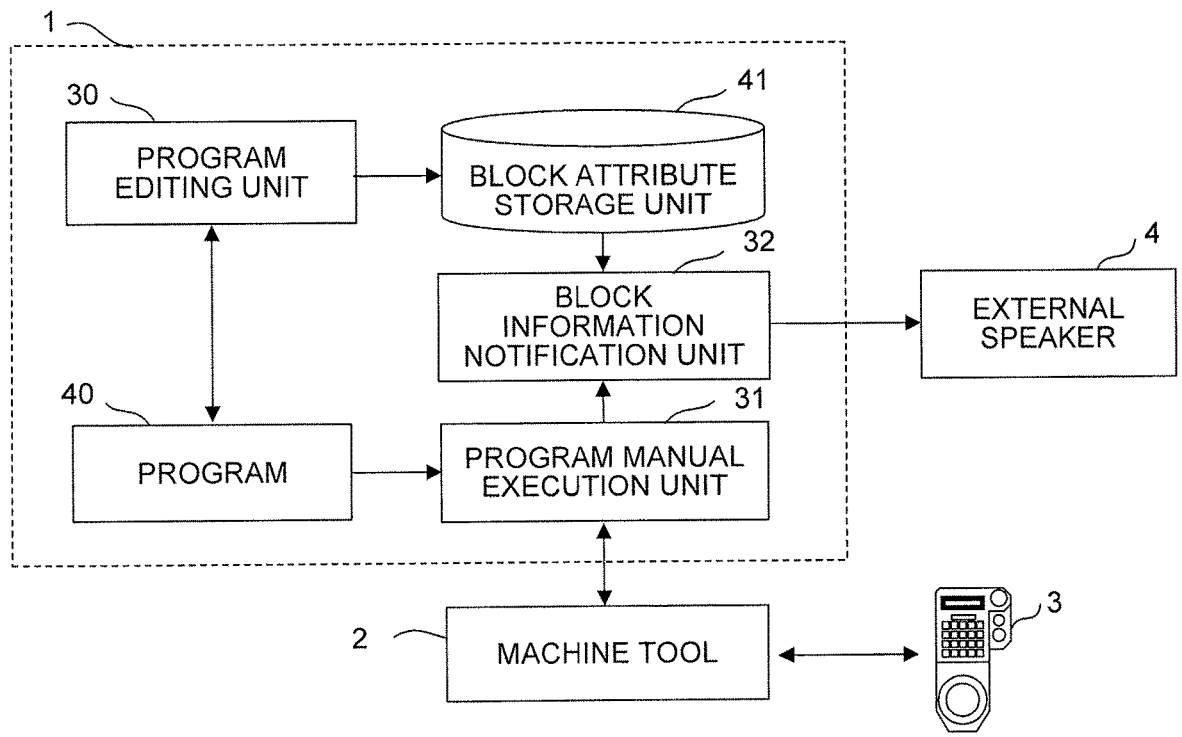
FIG. 6 is a functional block diagram for a numerical controller according to a first embodiment of the invention.

FIG. 6 is a functional block diagram for a numerical controller according to a first embodiment of the invention.

The numerical controller 1 according to the embodiment includes a program editing unit 30, a program manual execution unit 31, and a block information notification unit 32. In the numerical controller 1, a region where a program 40 is stored and a region (block attribute storage unit 41) where edited blocks are stored are ensured on a memory (not illustrated).

When the operator switches the numerical controller 1 to an editing mode for the program in the middle of operation check on the program 40 with use of the manual handle retrace function on the numerical controller 1, the program editing unit 30 displays an editing screen for the program 40 on the display device 20 of the numerical controller 1 and edits the program 40 pursuant to input from the operator through the keyboard 21. Once the program 40 is edited by the operator, the program editing unit 30 reflects relevant editing data in the program 40 and stores block attribute data that is information on edited blocks in the program 40 in the block attribute storage unit 41.

FIG. 7 is a diagram illustrating an example of the information on the edited blocks stored in the block attribute storage unit 41.

In the block attribute storage unit 41, the block attribute data in which block numbers and attributes of blocks are associated is stored. In case where N6 and N7 in the program 40 have been edited as illustrated as an example in FIG. 7, for instance, the numbers (6, 7) of the edited blocks and an attribute value (attribute value for edited block is set as 1 in FIG. 7) indicating that the blocks are edited blocks are associated with each other and stored in the block attribute storage unit 41.

The program manual execution unit 31 functions when the manual handle retrace function is used in the numerical controller 1. The program manual execution unit 31 receives operation signals via the machine tool 2 from the manual handle 3 used as the manual program execution instruction unit by the operator, executes the program 40 forward or reversely based on the received operation signals, and outputs execution status (block number of a block being currently executed, information on the advancing execution/reversing execution, movement amounts of the axes to be attained by an instruction of the block, current movement amounts of the axes attained by the instruction of the block, block number of a block to be executed subsequently to the block, and/or the like) of the program to the block information notification unit 32.

Further, the program manual execution unit 31 reads out blocks of program instructions from the program 40, analyzes the blocks read out, and thereby generates data on moving instructions. Based on the operation signals from the manual handle 3, the program manual execution unit 31 instructs the axis control circuits 14 to bring about forward movement conforming to the generated data on the moving instructions, when the manual handle 3 is normally rotated, or to bring about reverse movement conforming to the generated data on the moving instructions, when the manual handle 3 is reversely rotated, and thus controls the axes the machine tool 2 has. Then travelling velocities, the travels, and/or the like may be controlled in accordance with a rotational speed of the manual handle 3.

Axis control operation for the machine tool 2 by the program manual execution unit 31 based on the operation signals from the manual handle 3 is sufficiently disclosed as prior art techniques such as Japanese Patent Application Laid-Open No. 08-001482 and thus detailed description thereon is omitted herein.

The block information notification unit 32 determines whether the block the execution of which is about to be started is the block edited by the operator or not, from the attribute information on the blocks that is stored in the block attribute storage unit 41 and information that indicates the execution status of the program and that is received from the program manual execution unit 31 and, if the block the execution of which is about to be started is the block edited by the operator, notifies the operator of such purport by making the external speaker 4 emit a sound. The block information notification unit 32 may make a sound indicating that the block is the edited block or may sound the block number of the block by synthesized speech as well as making the sound indicating that the block is the edited block. Such sounding may be carried out only when the program 40 is executed forward or different sounds may be emitted in the advancing execution/reversing execution so that the advancing execution/reversing execution can be distinguished.

Figure 8:
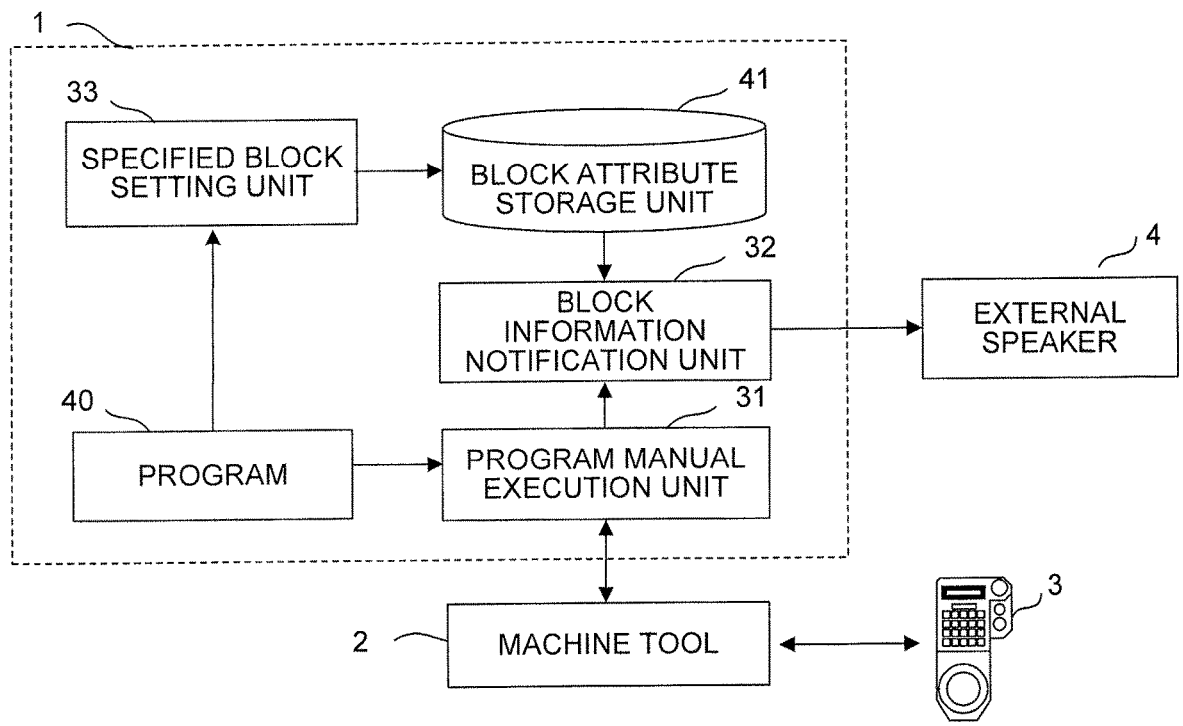
FIG. 8 is a functional block diagram for a numerical controller according to a second embodiment of the invention.

FIG. 8 is a functional block diagram for a numerical controller according to a second embodiment of the invention.

The numerical controller 1 according to the embodiment includes the program manual execution unit 31, the block information notification unit 32, and a specified block setting unit 33. In the numerical controller 1, the region where the program 40 is stored and the region (block attribute storage unit 41) where the specified blocks are stored are ensured on a memory (not illustrated).

The specified block setting unit 33 receives specification of blocks in the program 40 that are objects to be notified to the operator based on operation by the operator on the keyboard 21 of the numerical controller 1 or the like and stores in the block attribute storage unit 41 the block attribute data that is the information on the blocks specified as objects to be notified to the operator.

Figure 9:
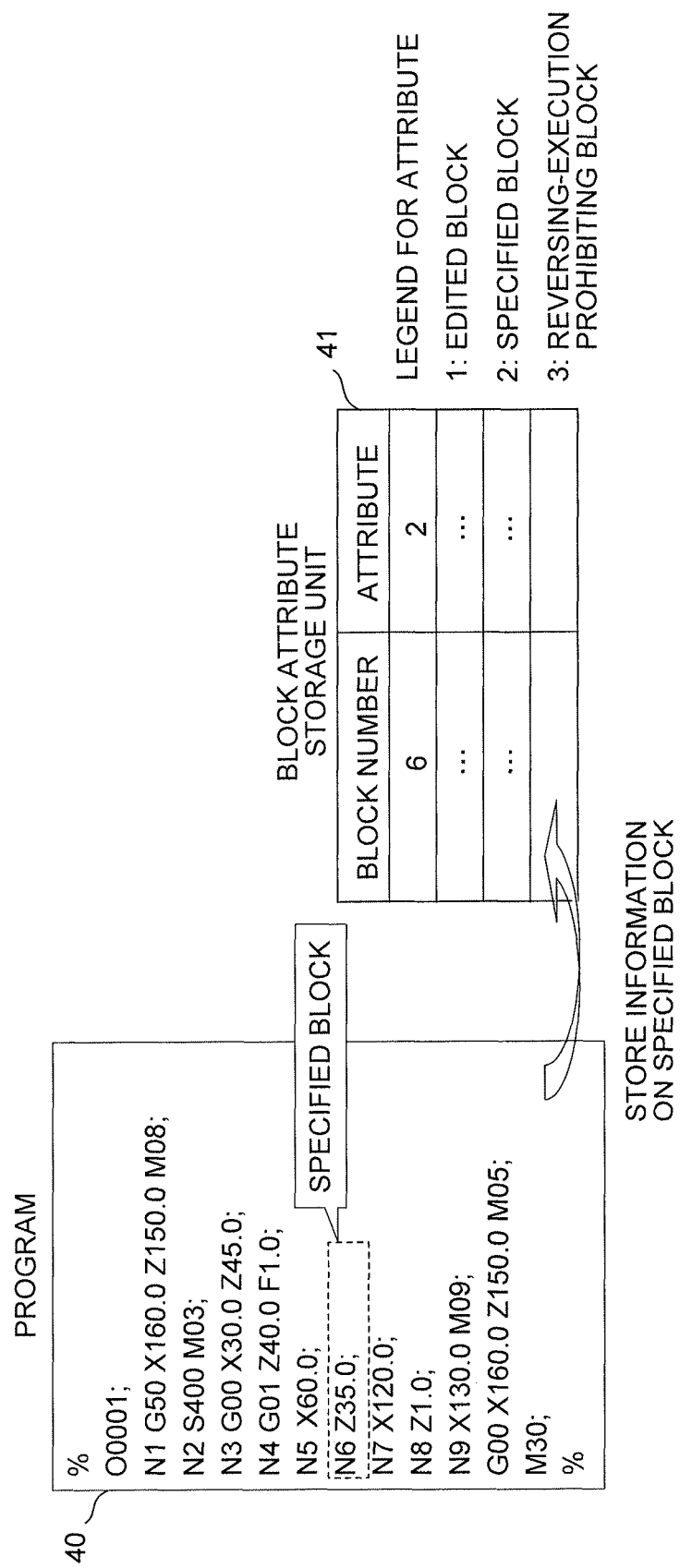
FIG. 9 is a diagram illustrating an example of block attribute data stored in the block attribute storage unit in the numerical controller of FIG. 8.

FIG. 9 is a diagram illustrating an example of the information on the blocks stored in the block attribute storage unit 41 and specified as objects to be notified to the operator.

In the example illustrated in FIG. 9, in which N6 in the program 40 is specified by the specified block setting unit 33 as the block that is the object to be notified to the operator, the number (6) of the specified block and an attribute value (attribute value for the specified block is set as 2 in FIG. 9) indicating that the block is the specified block are associated with each other and stored in the block attribute storage unit 41.

Operations of the program manual execution unit 31 are similar to operations of the program manual execution unit 31 of the first embodiment (FIG. 8).

The block information notification unit 32 determines whether the block the execution of which is about to be started is the block specified as an object to be notified to the operator or not, from the attribute information on the blocks that are stored in the block attribute storage unit 41 and the information that indicates the execution status of the program and that is received from the program manual execution unit 31 and, if the block the execution of which is about to be started is the block specified as an object to be notified to the operator, notifies the operator of such purport by making the external speaker 4 emit a sound. The block information notification unit 32 may make the sound indicating that the block is the block specified as an object to be notified to the operator or may sound the block number of the block by synthesized speech as well as making the sound indicating that the block is the block specified as an object to be notified to the operator. Such sounding may be carried out only when the program 40 is executed forward or different sounds may be emitted in the advancing execution/reversing execution so that the advancing execution/reversing execution can be distinguished.

Figure 10:
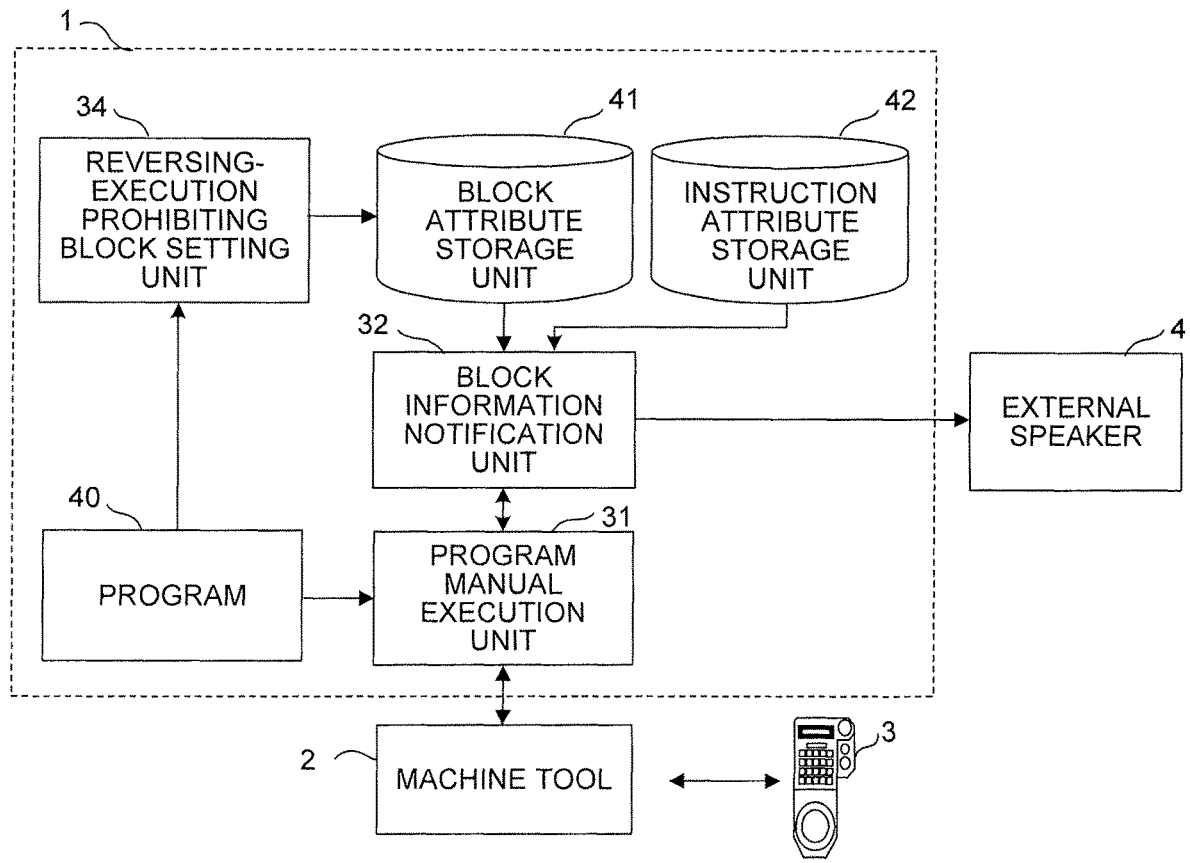
FIG. 10 is a functional block diagram for a numerical controller according to a third embodiment of the invention.

FIG. 10 is a functional block diagram for a numerical controller according to a third embodiment of the invention.

The numerical controller 1 according to the embodiment includes the program manual execution unit 31, the block information notification unit 32, and a reversing-execution prohibiting block setting unit 34. In the numerical controller 1, the region where the program 40 is stored and regions (block attribute storage unit 41, instruction attribute storage unit 42) where reversing-execution prohibiting blocks are stored are ensured on a memory (not illustrated).

In the instruction attribute storage unit 42, instruction codes which are used in the program 40 and instruction attribute data in which attributes defined by the specifications of the numerical controller 1 or the like are mapped so as to correspond to the instruction codes are stored. As an example among the attributes of the instruction codes, an attribute indicating an instruction code in which reversing execution of a program is prohibited can be adduced. The instruction attribute storage unit 42 may be provided on the ROM 11 and the information, stored in the instruction attribute storage unit 42, on the attributes of the instruction codes defined by the specifications of the numerical controller 1 or the like may be set and stored by a manufacturer or the like before shipment of the numerical controller 1.

The reversing-execution prohibiting block setting unit 34 receives specification of blocks in the program 40 that prohibit the reversing execution of the program through operation of the manual handle 3 by the operator when the manual handle retrace function is used in the numerical controller 1, based on operation by the operator on the keyboard 21 of the numerical controller 1 or the like, and stores in the block attribute storage unit 41 the block attribute data that is information on the blocks prohibiting the reversing execution of the program.

FIG. 11 is a diagram illustrating an example of the information on the blocks that are stored in the block attribute storage unit 41 and that prohibit the reversing execution of the program.

In the example illustrated in FIG. 11, in which N5 in the program 40 is specified by the reversing-execution prohibiting block setting unit 34 as the block that prohibits the reversing execution of the program, the number (5) of the specified block and an attribute value (attribute value for the reversing-execution prohibiting blocks is set as 3 in FIG. 11) indicating that the block is the block prohibiting the reversing execution of the program are associated with each other and stored in the block attribute storage unit 41.

In case where the operator is reversely executing the program at present and where the block the execution of which is about to be started includes an instruction code in which the reversing execution is prohibited or where the block the execution of which is about to be started is a block in which an attribute prohibiting the reversing execution of the program is set, in view of the instruction attribute data stored in the instruction attribute storage unit 42, the attribute information on the blocks that is stored in the block attribute storage unit 41, and the information that indicates the execution status of the program and that is received from the program manual execution unit 31, the block information notification unit 32 notifies the operator by sounding from the external speaker 4 that reversing operation is prohibited and issues instructions to prohibit the program manual execution unit 31 from reversely executing the program. The block information notification unit 32 may make a sound indicating that the block prohibits the reversing execution or may sound the block number of the block by synthesized speech as well as making the sound indicating that the block prohibits the reversing execution. Besides, sounds may be emitted so that it can be determined whether such prohibition is provided by the specifications of the numerical controller 1 or by specification by the operator.

Figure 12:
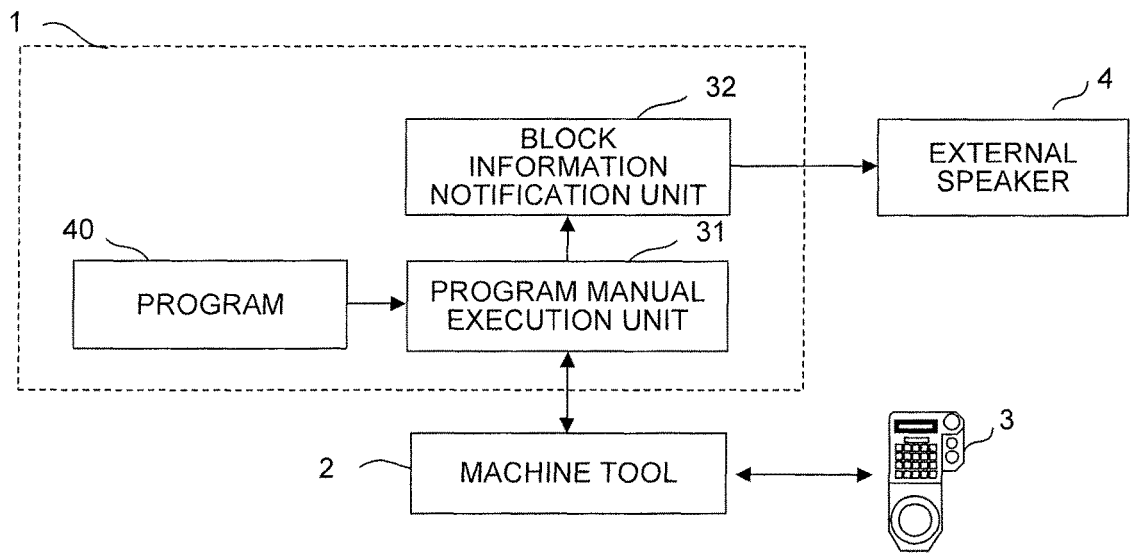
FIG. 12 is a functional block diagram for a numerical controller according to a fourth embodiment of the invention.

When receiving an instruction to prohibit the reversing execution of the program from the block information notification unit 32, the program manual execution unit 31 prohibits the reversing execution of the program by preventing the program from being reversely executed further even if the operator attempts to reversely execute the program. Then control through the machine tool 2 may be exercised so that the manual handle 3 cannot be reversely rotated. The other operations of the program manual execution unit 31 are similar to the operations of the program manual execution unit 31 in the numerical controller 1 (FIG. 6) according to the first embodiment FIG. 12 is a functional block diagram for a numerical controller according to a fourth embodiment of the invention.

The numerical controller 1 according to the embodiment includes the program manual execution unit 31 and the block information notification unit 32. In the numerical controller 1, the region where the program 40 is stored is ensured on a memory (not illustrated).

Operations of the program manual execution unit 31 are similar to the operations of the program manual execution unit 31 in the numerical controller 1 (FIG. 6) according to the first embodiment.

The block information notification unit 32 determines whether execution of a current block has approached a switching point to the subsequent block or not, from the information that is received from the program manual execution unit 31 and that indicates the execution status of the program, and, if it is determined that the execution of the current block has approached the switching point to the subsequent block, notifies the operator of such purport by sounding from the external speaker 4.

It can be determined that the execution of the current block has approached the switching point to the subsequent block, from the fact that sum of squares of remaining movement amounts of the axes resulting from the execution of the current block falls below a preset margin, based on movement amounts of the respective axes commanded by the block included in the information which indicates the execution status of the program, notified by the program manual execution unit 31, and current movement amounts of the respective axes based on the commands of the block.

The block information notification unit 32 may make a sound indicating that the execution of the current block has approached a switching point to the subsequent block or may sound the block number of the block by synthesized speech as well as making the sound indicating such purport. Such sounding may be carried out only when the program 40 is executed forward or different sounds may be emitted in the advancing execution/reversing execution so that the advancing execution/reversing execution can be distinguished.

Though the embodiments of the invention have been described above, the invention is not limited to the examples of the embodiments described above and can be embodied in various manners with appropriate modification.

Though the examples in which the operator is notified of the execution status of the program 40 by the sounds have been described as the embodiments, for instance, the operator may be notified by vibrations of the manual handle 3, light, signals, and/or the like.

Though the examples in which the manual handle 3 used as the manual program execution instruction unit is connected to the machine tool 2 have been described as the embodiments, the manual handle 3 may be connected to the numerical controller 1. Furthermore, buttons, levers, or the like other than the manual handle 3 may be used as the manual program execution instruction unit.

Figure 13:
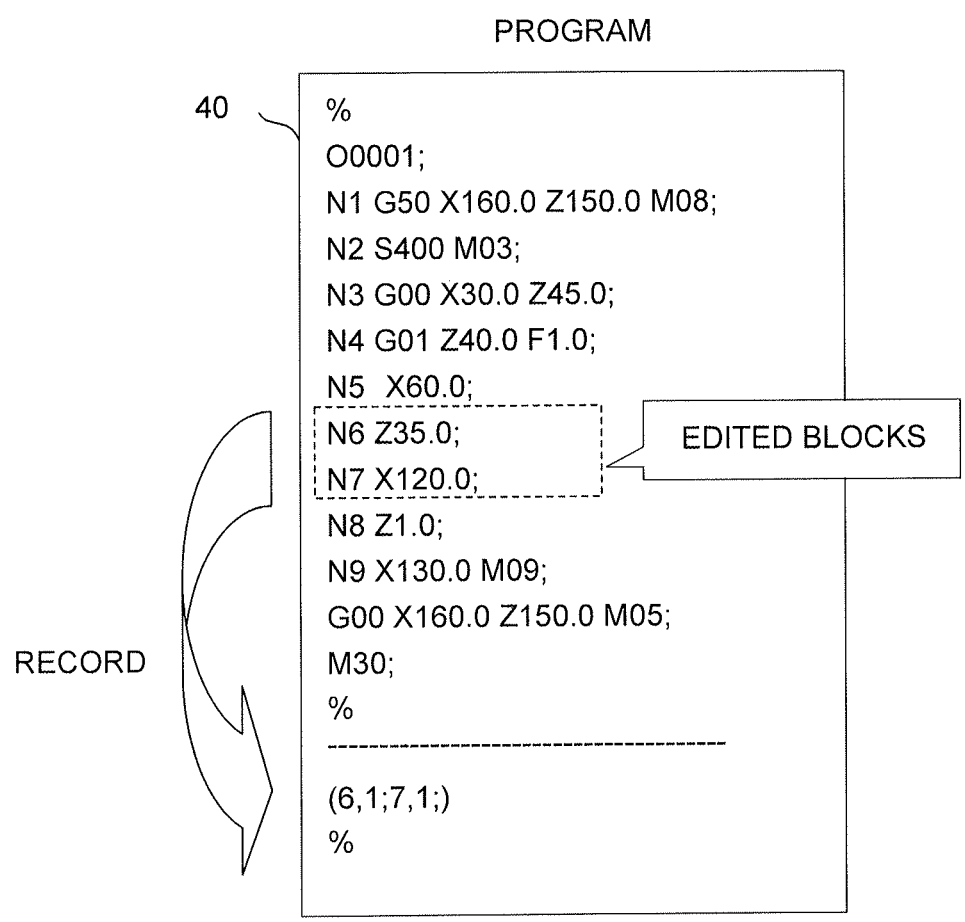
FIG. 13 is a diagram illustrating a method of storing attribute values of blocks in a program, the method being executed in a numerical controller according to another embodiment of the invention.
Figure 14:
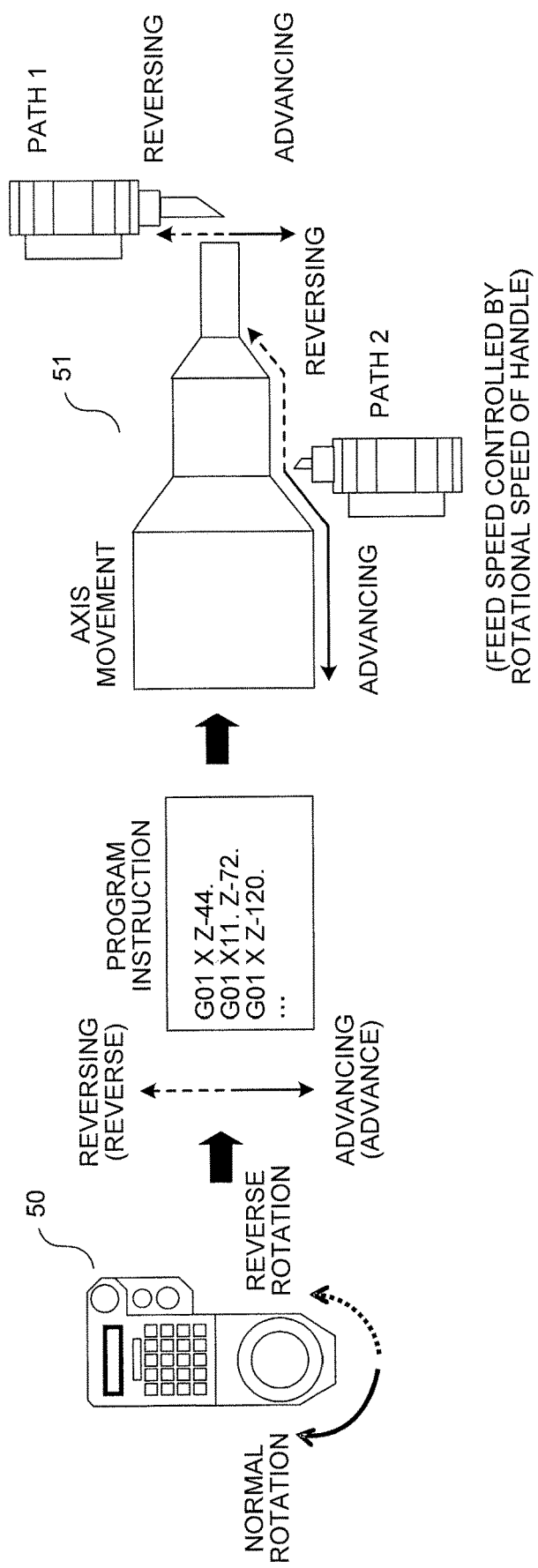
FIG. 14 is a diagram illustrating the manual handle retrace function according to a prior art technique.
Figure 15:
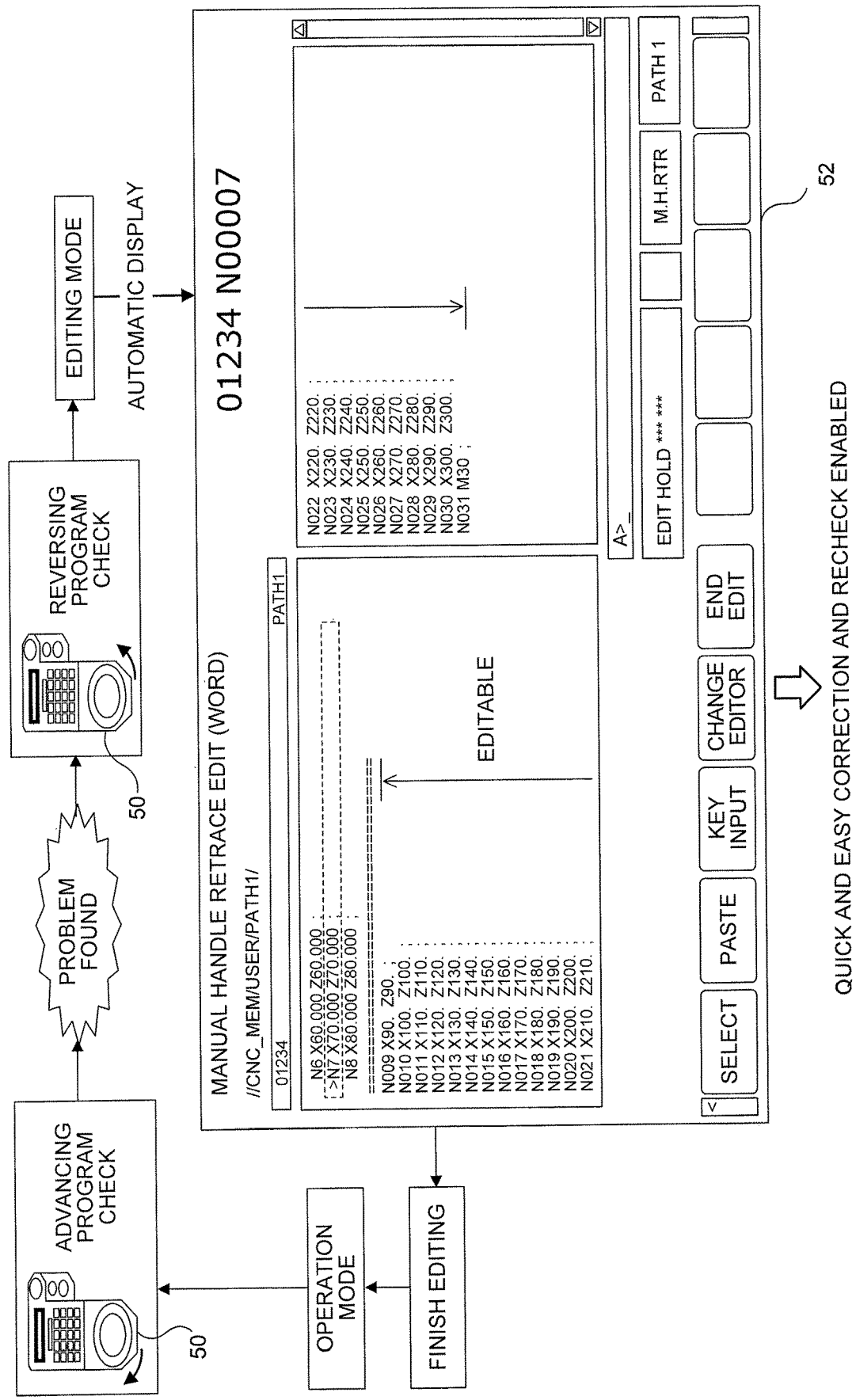
FIG. 15 is a diagram illustrating a program editing method using the manual handle retrace function according to the prior art technique.

Though the embodiments are configured so that the edited blocks, the specified block, or the prohibition block is stored in the block attribute storage unit 41, a method in which the program 40 itself is used as the block attribute storage unit 41 is also conceivable. As illustrated in FIG. 13, for instance, the block numbers and the attribute values (attribute value for the edited blocks is set as 1 in FIG. 13) of the blocks may be associated and recorded at an end of the program 40, the attribute values of the blocks recorded at the end of the program 40 may be read out and expanded onto the memory before the manual handle retrace function is used, and the above-mentioned notification functions may be executed based on the expanded attributes of the blocks. In such a configuration, the attribute values of the blocks are stored in the program without provision of the block attribute storage unit 41 on the nonvolatile memory and, even if a work is interrupted and the numerical controller 1 is powered off in midst of debugging the program, for instance, the work can be started with use of the attribute values of the blocks recorded until last interruption of the work without modification when the work is resumed.

For a program that controls a plurality of paths by the numerical controller 1 according to the embodiments, a configuration in which different sounds are emitted for the paths may be provided so that the operator can distinguish and comprehend the execution status in each path.

The above-mentioned first to fourth embodiments may be implemented with appropriate combination thereof.

The invention claimed is:

1. A numerical controller that controls a machine based on a program, the numerical controller comprising:
   a processor configured to:
   receive manual instructions for manually advancing and manually reversing execution of the program;
   control operation of the machine by sequentially executing the program in response to the manual instructions; and
   identify a block in the program execution of which is about to be executed in response to the manual instructions, based on an attribute of the identified block, and output a notification prior to execution of the identified block,
   wherein:
   a) in response to the block being identified as an edited block, output a first sound notification or a first vibration notification to an operator of the machine,
   b) in response to the block being identified as an specified block, output a second sound notification or a second vibration notification to the operator of the machine,
   c) in response to the block being identified as including a switching point to another block, output a third sound notification or a third vibration notification to the operator of the machine, and
   d) in response to block being identified as a prohibited block in which the reversing execution of the program is prohibited, output a fourth sound notification or a fourth vibration notification to the operator of the machine and control the machine to prohibit reverse operation, wherein the first sound notification, the second sound notification, the third sound notification and the fourth sound notification are distinct from one another, and wherein the first vibration notification, the second vibration notification, the third vibration notification and the fourth vibration notification are distinct from one another.

2. The numerical controller according to claim 1, wherein the processor is further configured to:

store, in a memory device, block attribute data in which block numbers of blocks included in the program and information indicating attributes of the blocks are associated, and determine the attribute of the block in the program the execution of which is about to be started, based on the block attribute data stored in the memory device.

3. The numerical controller according to claim 2, wherein the information indicating the attributes of the blocks is information indicating that the blocks are edited blocks.

4. The numerical controller according to claim 2, wherein the information indicating the attributes of the blocks is information indicating that the blocks are blocks which are to be objects to be notified to an operator.

5. The numerical controller according to claim 2, wherein the information indicating the attributes of the blocks is information indicating that the blocks are blocks in which the reversing execution of the program is prohibited.

6. The numerical controller according to claim 1, wherein the processor is further configured to:

store, in a memory device, instruction attribute data in which instruction codes used in the program and information indicating attributes of the instruction codes are associated, and determine the attribute of the block in the program the execution of which is about to be started, based on the instruction attribute data stored in the memory device.

7. The numerical controller according to claim 6, wherein the information indicating the attributes of the instruction codes is information indicating that the instruction codes are instruction codes in which the reversing execution of the program is prohibited.

8. The numerical controller according to claim 1, wherein the processor is further configured to:

output an instruction that prohibits the reversing execution of the program to the program manual execution unit when the attribute of the block the execution of which is about to be started is an attribute indicating that the reversing execution of the program is prohibited, and prohibit the reversing execution of the program upon receiving the instruction that prohibits the reversing execution of the program.

9. The numerical controller according to claim 1, wherein the processor is further configured to make notification when remaining movement amounts of respective axes given by a block being currently executed in the program are equal to or smaller than specified margins preset in advance, based on the execution status of the program.

* * * * *